(12) United States Patent
Durocher (10) Patent No.: US 11,906,017 B1
(45) Date of Patent: Feb. 20, 2024

(54) DRIVE ASSEMBLY AND METHOD OF ASSEMBLY

(71) Applicant: PRATT & WHITNEY CANADA CORP., Longueuil (CA)

(72) Inventor: Eric Sylvain Durocher, Boucherville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/327,945

(22) Filed: Jun. 2, 2023

(51) Int. Cl.
| | |
|---|---|
| F16H 1/28 | (2006.01) |
| F16H 57/04 | (2010.01) |
| F02C 7/36 | (2006.01) |
| F16D 3/06 | (2006.01) |

(52) U.S. Cl.
CPC ............... *F16H 1/28* (2013.01); *F02C 7/36* (2013.01); *F16D 3/06* (2013.01); *F16H 57/043* (2013.01); *F16H 57/0456* (2013.01); *F16H 57/0471* (2013.01); *F16H 57/0486* (2013.01); *F05D 2260/40311* (2013.01); *F16D 2250/0084* (2013.01); *F16D 2300/12* (2013.01)

(58) Field of Classification Search
CPC ...... F16H 1/28; F16H 57/043; F16H 57/0456; F16H 57/0471; F16H 57/0486; F02C 7/36; F16D 3/06; F16D 2250/0084; F16D 2300/12; F05D 2260/40311

USPC ........................................................ 475/149
See application file for complete search history.

(56) References Cited

U.S. PATENT DOCUMENTS

| | | | |
|---|---|---|---|
| 4,991,431 A | 2/1991 | Gaither | |
| 8,464,598 B2 | 6/2013 | Cazaux et al. | |
| 10,634,233 B1* | 4/2020 | Smith | ................. F16H 57/0417 |
| 10,845,294 B1* | 11/2020 | Lincoln | .............. G01N 15/0211 |
| 2006/0166778 A1* | 7/2006 | Tabata | ................... F16H 57/043 |
| | | | 475/159 |
| 2017/0074356 A1* | 3/2017 | Webster | .................... F02C 7/36 |
| 2018/0171816 A1* | 6/2018 | Moniz | ..................... F01D 17/04 |

* cited by examiner

*Primary Examiner* — Colby M Hansen
(74) *Attorney, Agent, or Firm* — Norton Rose Fulbright Canada LLP (57) ABSTRACT

The torque transfer assembly can have a torque shaft rotatable around a rotation axis, the torque shaft having a first end and a second end opposite the first end along the rotation axis, a first reference feature at an intermediary location between the first end and the second end, and a sun gear integrated to the torque shaft, at the first end, the second end has a first external diameter, and the sun gear having a second external diameter greater than the first external diameter; and a reference tube having a fixed end secured to the torque shaft adjacent the second end, a free end having a second reference feature adjacent the first reference feature, the reference tube extending around the torque shaft, the reference tube having an internal diameter, the internal diameter being between the first external diameter and the second external diameter.

20 Claims, 8 Drawing Sheets

300 — Engaging a second end of a torque shaft into a free end of a reference tube bearing a first reference feature, and sliding the reference tube towards a first end of the torque shaft opposite the second end, until the free end of the reference tube reaches an intermediary location of the torque shaft, the torque shaft having a sun gear at the first end and a second reference feature at the intermediary location 310 → 320 — Securing a fixed end of the reference tube to the second end of the torque shaft, the fixed end of the reference tube opposite the free end

FIG. 8

UNITED STATES PATENT

DRIVE ASSEMBLY AND METHOD OF ASSEMBLY

TECHNICAL FIELD

The application relates generally to aircraft engines and, more particularly, to the measurement of the torque transferred between an engine and an output shaft.

BACKGROUND OF THE ART

Aircraft engines may require a torque measurement system integrated to the drive assembly to detect shaft torque, such as to provide feedback to a control system used for operating the engine. While existing systems were satisfactory to a certain degree, there always remains room for improvement. Indeed, various contextual elements may motivate aircraft component designers to adapt existing solutions to new contexts, or to find new solutions. Moreover, aircraft component designers evolve in a complex environment where many factors are to be accounted for, such as volume, weight, costs (both initial and maintenance-related), assembly considerations, reliability, etc.

SUMMARY

In one aspect, there is provided a torque measurement system comprising: a torque shaft rotatable around a rotation axis, the torque shaft having a first end and a second end opposite the first end along the rotation axis, a first reference feature at an intermediary location between the first end and the second end, and a sun gear integrated to the torque shaft, at the first end; a reference tube having a fixed end secured to the torque shaft adjacent the second end, a free end having a second reference feature adjacent the first reference feature, the reference tube extending around the torque shaft; a torque sensor fixed relative to the rotation axis, the torque sensor operable to measure a distance between the first reference feature and the second reference feature; a source shaft rotatable around the rotation axis, the source shaft coupled to the second end; a ring gear fixed relative the rotation axis and concentric to the rotation axis; a plurality of planetary gears circumferentially distributed around the rotation axis, the plurality of planetary gears engaged between the sun gear and the ring gear; an output shaft having a carriage receiving the plurality of planetary gears in an individually rotatable manner, the output shaft rotatable with the carriage and the plurality of planetary gears as a whole around the rotation axis.

In another aspect, there is provided a torque transfer assembly comprising: a torque shaft rotatable around a rotation axis, the torque shaft having a first end and a second end opposite the first end along the rotation axis, a first reference feature at an intermediary location between the first end and the second end, and a sun gear integrated to the torque shaft, at the first end, the second end has a first external diameter, and the sun gear having a second external diameter greater than the first external diameter; and a reference tube having a fixed end secured to the torque shaft adjacent the second end, a free end having a second reference feature adjacent the first reference feature, the reference tube extending around the torque shaft, the reference tube having an internal diameter, the internal diameter being between the first external diameter and the second external diameter.

In a further aspect, there is provided a method of assembling a torque transfer assembly, the method comprising: engaging a second end of a torque shaft into a free end of a reference tube bearing a first reference feature, and sliding the reference tube towards a first end of the torque shaft opposite the second end, until the free end of the reference tube reaches an intermediary location of the torque shaft, the torque shaft having a sun gear at the first end and a second reference feature at the intermediary location; and securing a fixed end of the reference tube to the second end of the torque shaft, the fixed end of the reference tube opposite the free end.

DESCRIPTION OF THE DRAWINGS

Reference is now made to the accompanying figures in which.

DETAILED DESCRIPTION

Figure 1:
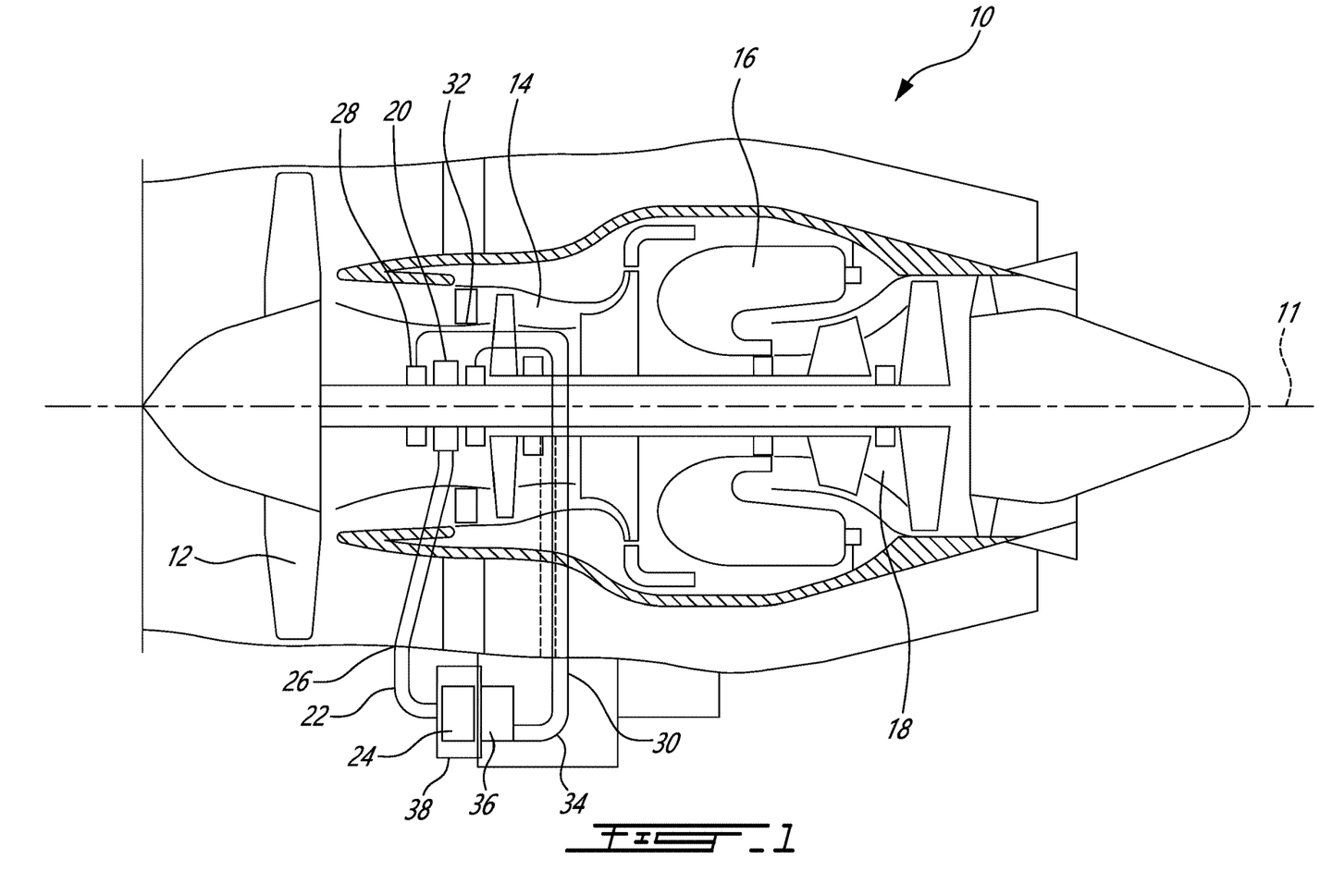
FIG. 1 is a schematic cross-sectional view of a gas turbine engine.

FIG. 1 illustrates an example of an aircraft engine, and more specifically a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases.

The compressor section 14, fan 12 and turbine section 18 have rotating components which can be mounted on one or more shafts. Bearings 20 are used to provide smooth relative rotation between a shaft and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to contain the oil. A scavenge system 30 having cavities 32, conduits 34, and one or more scavenge pumps 36, is used to recover the oil, which can be in the form of an oil foam at that stage, from the bearings 20. The oil pump 24 draws the oil from an oil reservoir 38. Air/oil separating devices (not shown) may be provided in the return line.

The gas turbine engine 10 presented in FIG. 1 is a type of gas turbine engine 10 referred to as a turbofan engine, which can be used in aviation. Other gas turbine engine types may be used in aviation such as turboprop engines, where the power shaft drives a propeller, via a reduction gearbox, rather than a fan, or turboshaft engines where the power shaft may be used to drive helicopter rotors, also via a reduction gearbox.

Figure 2:
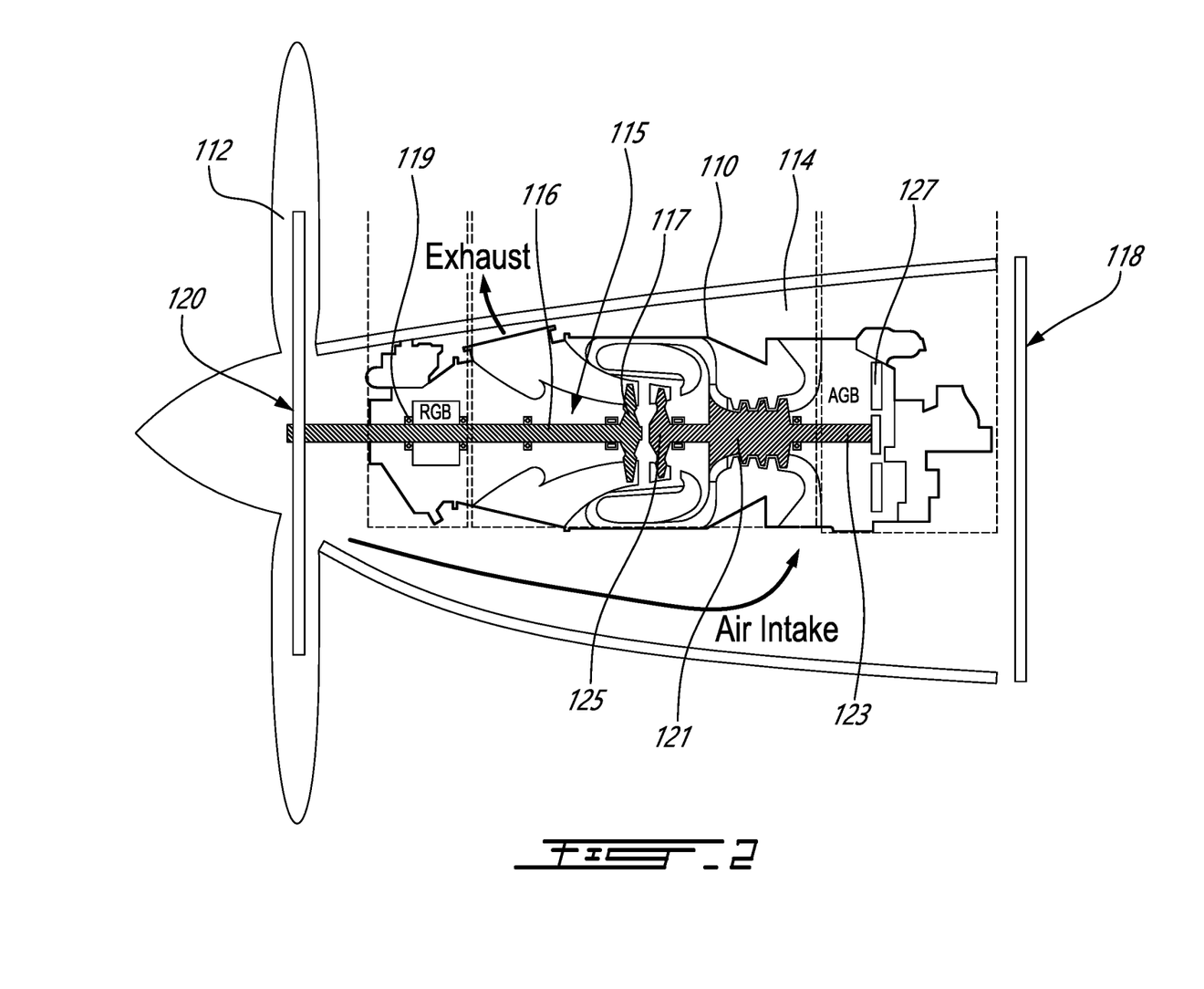
FIG. 2 is a schematic cross-sectional view of an example of an aircraft powerplant installation.

FIG. 2 illustrates an aircraft powerplant including a turboprop engine 110 for driving a propeller 112. The engine 110 is housed within a nose 114 of an aircraft. In this example, a drive assembly 115 includes a low pressure shaft 116 (also referred to as a power shaft) connecting a low pressure turbine stage 117 to the propeller 112, via a reduction gearbox (RGB) 119, whereas a high pressure shaft 123 connects a compressor 121 to a high pressure turbine stage 125 and to an accessory gearbox (AGB) 127. Numerous variants are possible in different applications.

Other types of engines may be used in aviation. For instance, aircraft hybrid powerplants comprising a combination of electric and heat engines or aircraft powerplants with electric engines only are contemplated. There can even be a motivation to retrofit an electric engine to replace an existing, possibly ageing, heat engine in an aircraft. Either retrofitting an electric engine to an existing aircraft, or designing an aircraft for receiving a new engine, may involve taking certain limitations into consideration. For example, in the example presented in FIG. 2, housing an engine in an aircraft may be affected by factors such as typical engine installation constraints, such as engine cowling of a narrow body shape (which may be tied to propeller thrust efficiency, pilot visibility, and aircraft performance-drag, for instance), the presence of a cabin firewall 118, or the propeller plane 120 axial position, which may impose particular limits in terms of dimensions or volume, in addition to other typical considerations in aviation such as cost (production and maintenance), weight, reliability, etc. In the case of retrofitting an electric engine to a heat engine emplacement on an existing aircraft, additional challenges can exist in terms of finding ways to address other functionalities of the existing engine, such as driving accessories such as an oil pump 24, 36, fuel-hydraulic actuators, heat exchangers, etc. Various considerations, such as those presented above for example, may motivate an aircraft component designer to limit certain dimensions or a volume of a torque measurement system integrated to a drive assembly, and/or to find better ways to integrate a torque measurement system to a given context.

Figure 3:
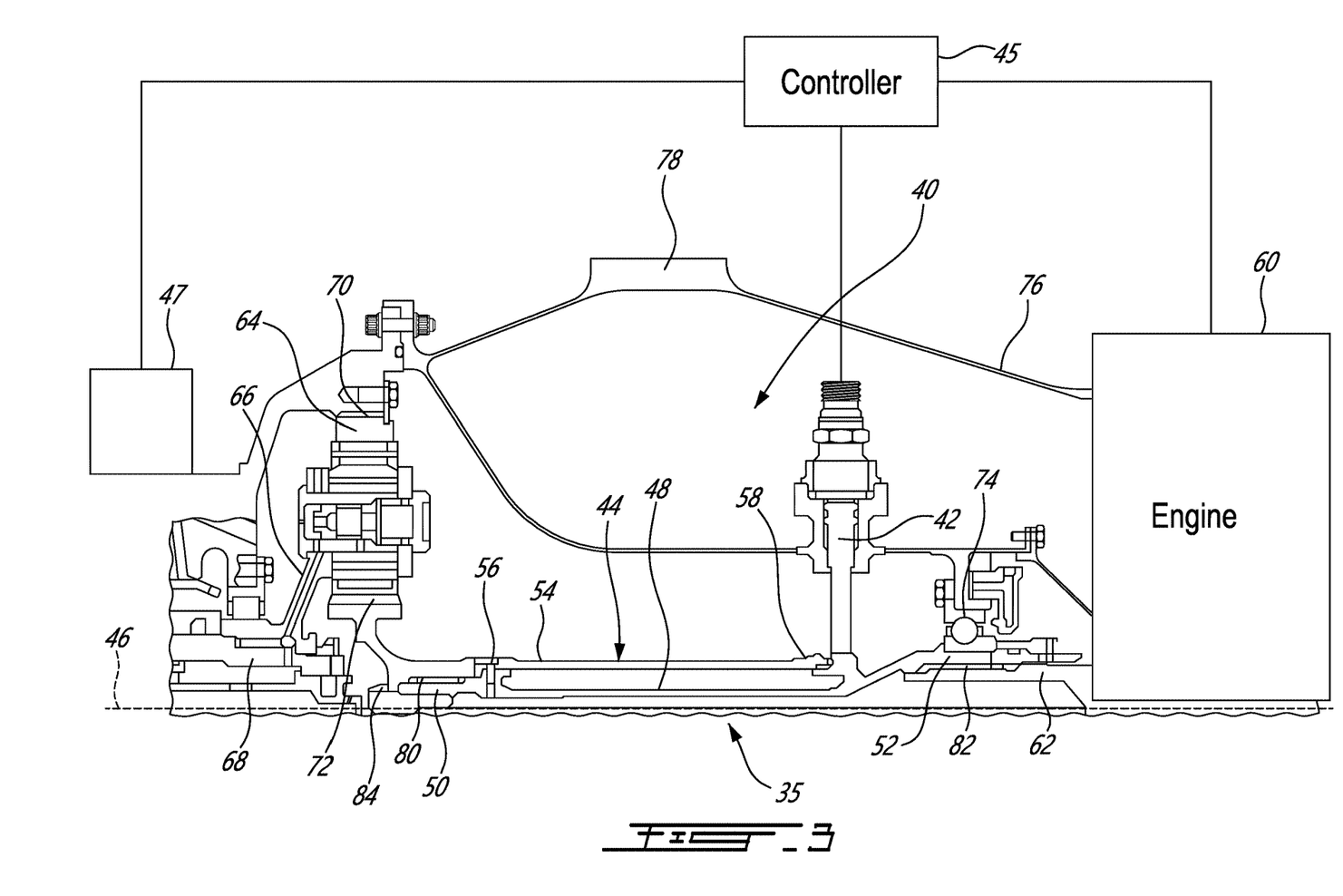
FIG. 3 is a cross-sectional view of a torque transfer assembly for use with an aircraft powerplant in accordance with one or more embodiments.

FIG. 3 presents an example of a torque measurement system 40 integrated to a drive assembly 35 in the context of an aircraft propulsion system. More specifically, the torque measurement system 40 includes a torque sensor 42, and a torque transfer assembly 44. The torque transfer assembly 44 rotates around a rotation axis 46. The torque transfer assembly 44 includes a torque shaft 48 extending between a first end 50 and a second end 52 along the rotation axis 46, and a reference tube 54. The reference tube 54 has a fixed end 56 via which it is fixed to the torque shaft 48, and a free end 58 opposite the fixed end 56, relative the rotation axis 46. An engine 60, such as a heat engine or electric engine, may be operable to drive another shaft which will be referred to herein as the source shaft 62, either directly (e.g., the source shaft 62 is the engine shaft) or indirectly (e.g., the engine shaft is coupled to the source shaft 62). The source shaft 62 is drivingly coupled to the second end 52 of the torque shaft 48. In the context of an electric engine, which can also operate as a generator, the source shaft 62 can act as a power output shaft during generator mode. The torque measurement system 40 can be configured to generate, via the torque sensor 42, a signal indicative or torque in the torque shaft 48, or a torque measurement. The signal indicative of torque may be communicated to a controller 45, which may be configured to control one or more elements of the aircraft propulsion system, such as the engine 60 or a propeller control unit 47, based on one or more input including the signal indicative of torque or torque measurement. For instance, a controller may be configured to deactivate the engine 60 if the measured torque exceeds a given threshold.

Following on with the example presented at FIG. 3, reduction gearing can be provided at the end of the torque transfer assembly 44 which is opposite the engine 60. In this example, the reduction gearing is epicyclic gearing. The epicyclic gearing has a plurality of planetary gears 64 (only one of which is shown) which are circumferentially distributed around the rotation axis 46. The planetary gears 64 are each rotatably held by a component which will be referred to herein as a carriage 66. The carriage 66 is rotatable around the rotation axis 46 together with an other shaft which will be referred to herein as the output shaft 68, and each planetary gear 64 is rotatable around a corresponding planet axis, relative the carriage 66. The carriage 66 and the output shaft 68 can be integrated to one another, or form different components of an output assembly. It will be understood that if the engine 60 is an electric engine which can operate in generator mode, the output shaft 68 can act as a power source when operating in the generator mode. The epicyclic gearing further has a ring gear 70 coaxial to the rotation axis 46 and surrounding the planetary gears 64, and a sun gear 72 coaxial to the rotation axis 46 and surrounded by the planetary gears 64. Each planetary gear 64 is meshed on the one hand with the sun gear 72, in the radially internal direction, and on the other hand with the ring gear 70, in the radially external direction. The planetary gears 64 can revolve around the axis 46 while remaining engaged with the sun gear 72 and the ring gear 70 and rotating around individual planet axes. The planet axes are offset from, but parallel to, the rotation axis. In this example, the sun gear 72 is assembled to the torque shaft 48. When the engine 60 operates in a manner to convey power to the output shaft 68, the power is transferred from the source shaft 62 to the output shaft 68 via the torque transfer assembly 44 and the epicyclic gearing.

An additional contextual element in some embodiments may be the presence of a bearing assembly 74 (e.g., a ball bearing) to support the torque shaft 48 to a case 76 (e.g., a case 76 having mounts 78), while allowing rotation of the torque shaft 48 relative the case 76, and the fact that a lubrication path may be integrated to allow the delivery of oil to the bearing assembly 74. A lubrication path may also be integrated to allow the delivery of oil to the epicyclic gearing.

In the specific example presented in FIG. 3, the reference shaft is tubular, and can thus be referred to as a reference tube 54. The reference tube 54 extends around the torque shaft 48, along a portion of the length thereof, and has an external diameter and an internal diameter. In this embodiment, the fixed end 56 of the reference tube 54 is secured to the torque shaft 48 at the first end 50, adjacent the sun gear 72. The sun gear 72 is coupled to the first end 50 of the torque shaft 48 via a spline 80. Here, the torque shaft 48 has a male member of the spline (or male spline) at the first end 50, and the sun gear 72 has a female member of the spline (or female spline). In this embodiment, the second end 52 of the torque shaft 48 is i) coupled to the source shaft 62 and ii) directly engaged with the bearing assembly 74. More specifically, the second end 52 of the torque shaft 48 has an external diameter engaged with the bearing assembly 74. Moreover, the second end 52 of the torque shaft 48 has a female member of a spline 82 receiving a male member of the spline 82 integrated to the source shaft 62. The axial location of the spline 82 engagement between the torque shaft 48 and the source shaft 62 in this embodiment corresponds to the axial location of the bearing assembly 74. The external diameter of the second end 52 of the torque shaft 48 is greater than the internal diameter of the of the reference tube 54, while the external diameter of the first end 50 of the torque shaft 48 is smaller than the internal diameter of the reference tube 54. In other words, the dimension of the internal diameter of the reference tube 54 is between the dimension of the external diameter of the first end 50 and the dimension of the external diameter of the second end 54.

Accordingly, during assembly, the reference tube 54, which may be manufactured separately from the torque shaft 48 and from the sun gear 72, may be slid around the torque shaft 48 via the first end 50, past the spline 80, until it reaches its assembled position shown. The fixed end 56 of the reference tube 54 may then be fixed to the torque shaft 48. One example way of fixing the fixed end 56 of the reference tube 54 to the torque shaft 48 is by introducing pins radially inwardly into apertures formed across the reference tube 54 and leading into the torque shaft 48, and then sliding a ring or collar axially over the location of the pins, to prevent the pins from being expulsed from the apertures due to centripetal acceleration. The pins can be circumferentially distributed. The sun gear 72, which can be manufactured separately from the torque shaft 48 and from the reference tube 54, is then coupled to the first end 50 of the torque shaft 48, via the spline 80. In this specific embodiment, a threaded member 84 is used to axially clamp the sun gear 72 against the first end 50 of the torque shaft 48, and the sun gear 72 has an abutment which prevents the axial movement of the collar or ring. While the embodiment presented in FIG. 3 is satisfactory, it may leave wants in some situations. For example, the presence of a spline 80 coupling the sun gear 72 to the first end 50 of the torque shaft 48 may be associated to a certain amount of axial length which may not be available in some situations or may otherwise not be desired. Moreover, positioning the torque sensor 42 adjacent the second end 52 may not be convenient or possible in some situations.

Figure 4:
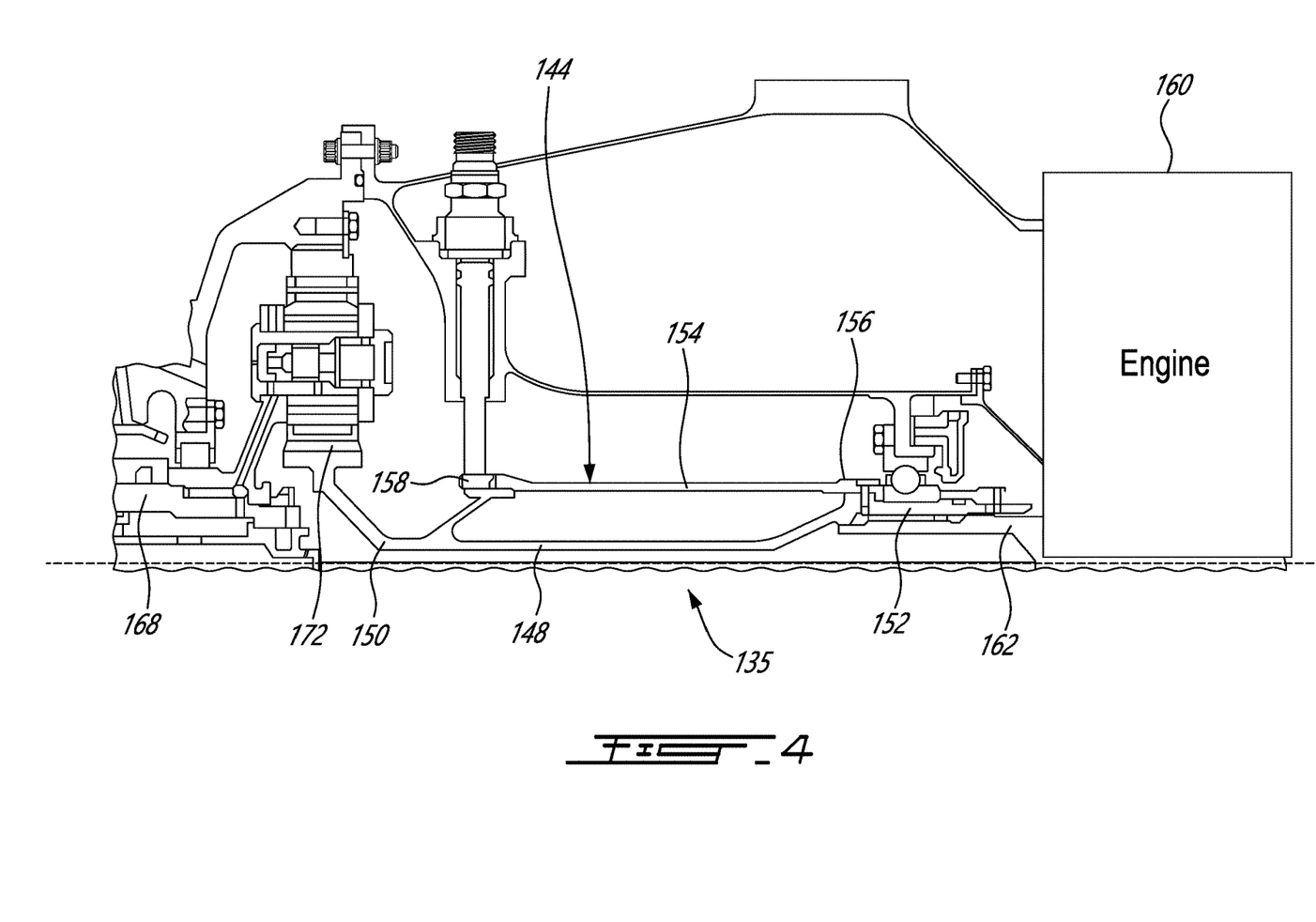
FIG. 4 is a cross-sectional view of another torque transfer assembly in accordance with one or more embodiments.

FIG. 4 presents another embodiment of a torque transfer assembly 144 forming part of a drive assembly 135. In the embodiment of FIG. 4, the overall context into which the torque transfer assembly 144 is integrated is similar to the one presented in relation with FIG. 3, in that the torque transfer assembly 144 may be used to transfer power from an engine 160, or more specifically from a source shaft 162, to an output shaft 168, via an epicyclic gearing. However, some elements of the torque transfer assembly 144 are different in the embodiment of FIG. 4. Indeed, in the embodiment presented in FIG. 4, the torque transfer assembly 144 has the sun gear 172 integrated to the torque shaft 148. In this specification, integrated refers to the fact that the component having the torque shaft 148 and the sun gear 172 is monolithic, and has a unitary body, i.e. that the component having the torque shaft 148 and the sun gear 172 can be manufactured as a single component as opposed to an assembly or more than one component. In this context, there is no coupling between the sun gear 172 and the torque shaft 148. Accordingly, since the sun gear 172 is integrated to the torque shaft 148, and that the internal diameter of the reference tube 154 is smaller than the external diameter of the sun gear 172, the reference tube 154 cannot be slid into position via the first end 150. Rather, in this embodiment, the reference tube 154 is slid into position via the second end 152, which is provided with an external diameter which is smaller than the internal diameter of the reference tube 154. Moreover, the fixed end 156 of the reference tube 154 is provided here adjacent the second end 152 rather than adjacent the first end 150, and the intermediary location corresponding to the axial position of the reference features and of the torque sensor (typically at the free end 158) is closer to the first end 150 than to the second end 152. It was found that using such a configuration could allow avoiding the presence of a spline coupling between the sun gear 172 and the torque shaft 148, and thereby allow to reduce the length and/or the weight of the resulting assembly. The reference shaft can be stacked between the bearing assembly and the output shaft 168.

Figure 5:
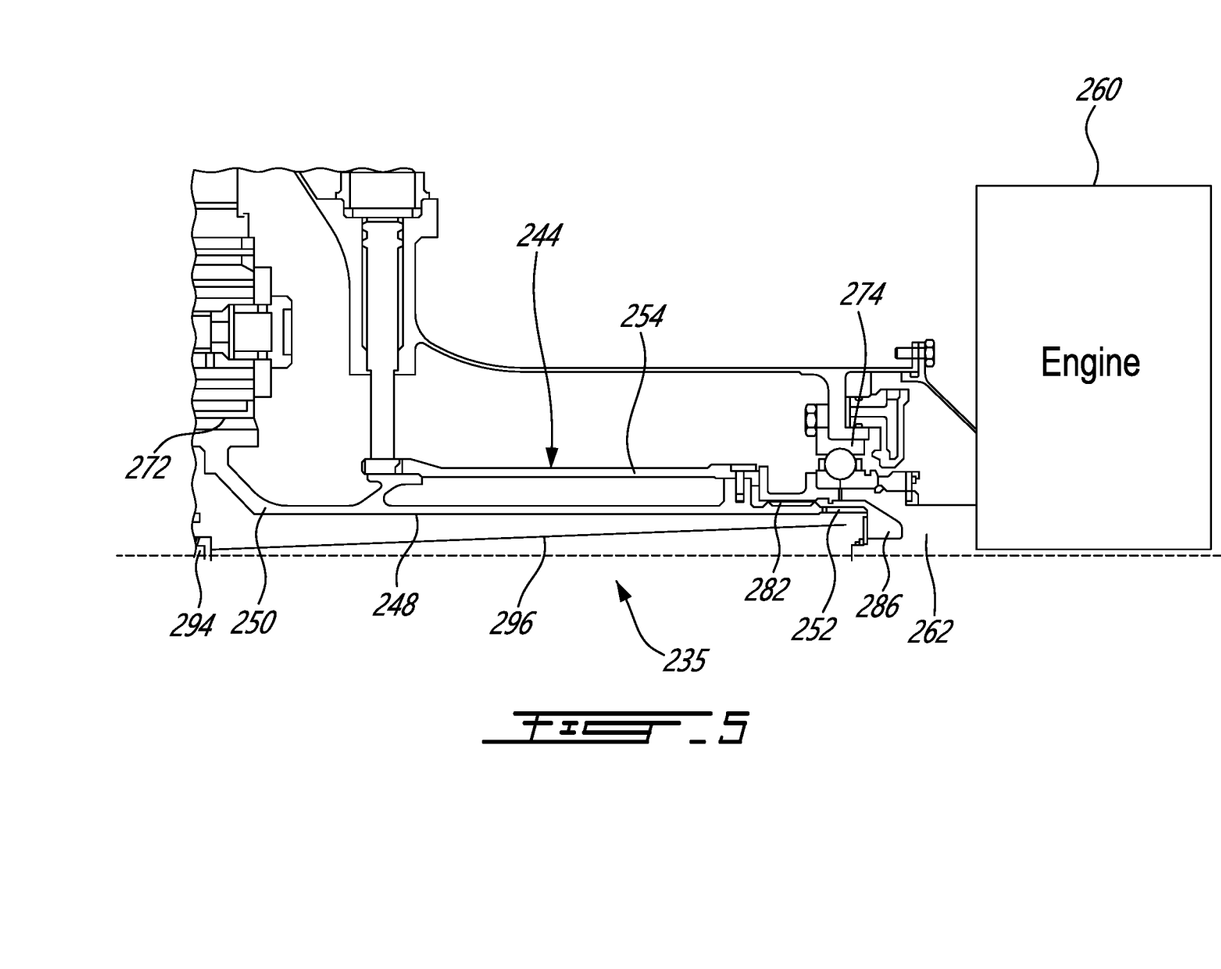
FIG. 5 is a cross-sectional view of a further torque transfer assembly in accordance with one or more embodiments.
Figure 6:
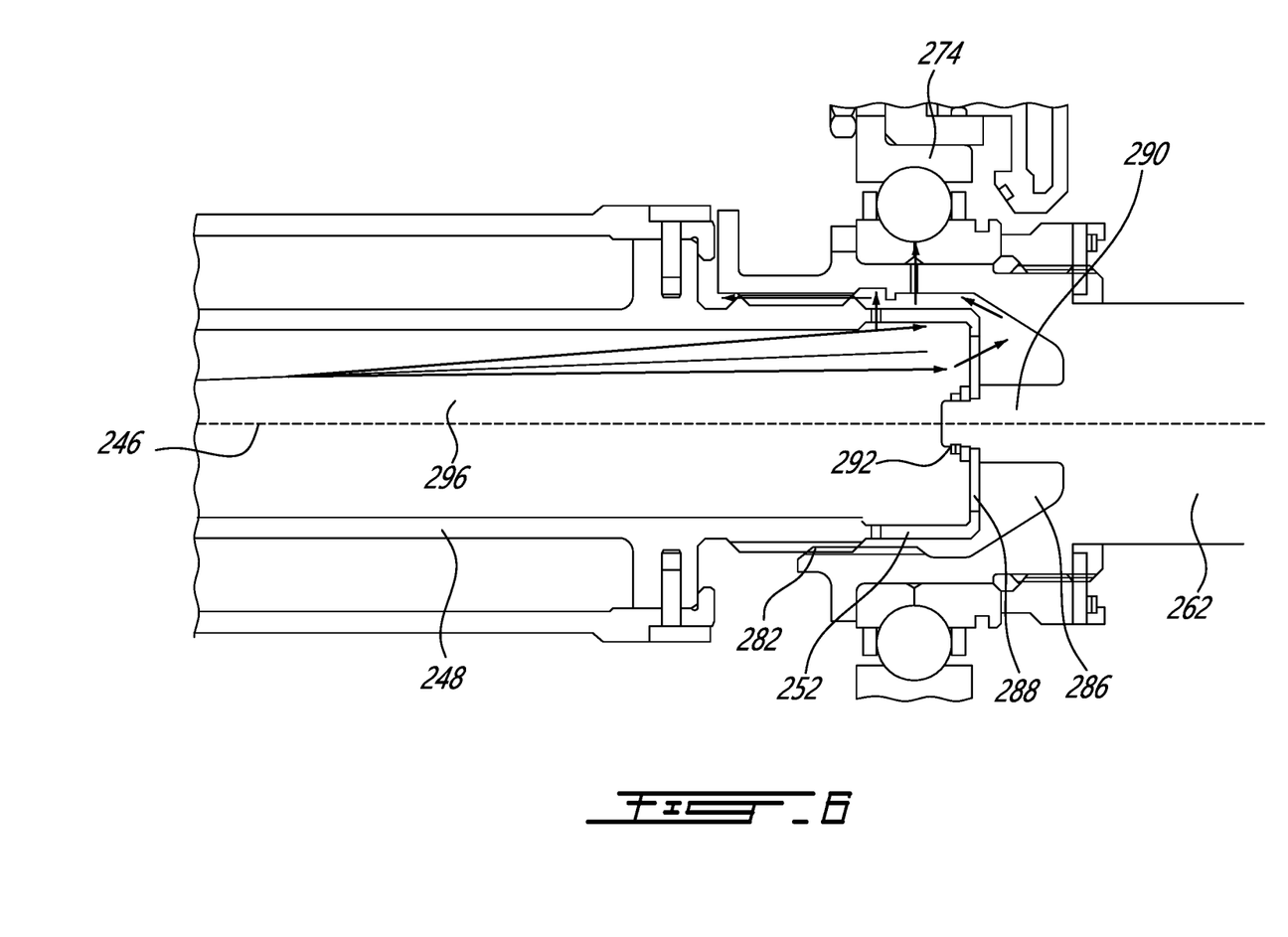
FIG. 6 presents an enlarged portion of FIG. 5 showing additional detail.

FIG. 5 presents yet another embodiment. In the embodiment presented in FIG. 5 the overall context into which the torque transfer assembly 244 is integrated to a drive assembly 235 is similar to the one presented in relation with FIG. 4, in that the torque transfer assembly 244 may be used to transfer power from an engine 260, or more specifically from a source shaft 262, to an output shaft, via an epicyclic gearing. There are also several similarities in the torque transfer assembly 244 itself, such that in the embodiment of FIG. 5 as well, the sun gear 272 is integrated to the torque shaft 248, and the reference tube 254 is fixed at the second end 252. However, the way the torque shaft 148 is coupled to the source shaft 262 and supported by the bearing assembly 274 is different. In particular, in this embodiment, the torque shaft 248 has a male member of a spline 282 at the second end 252, and the source shaft 262 has a female member of the spline 282. The female spline is integrated to a cavity 286 formed in the tip of the source shaft 262, the cavity 286 receiving the second end 252 of the torque shaft 248 upon assembly. Moreover, as better seen in FIG. 6, the second end 252 of the torque shaft 248 is provided with an extension having a radially-inwardly projecting flange 288 having a central opening, inside the cavity 286. A coaxial male member 290 is provided as part of the source shaft 262, in the cavity, which is designed to engage the central aperture. A tip of the male member 290 may protrude across the central aperture, and a holding element 292 may be assembled to the tip of the male member 290 to lock the relative axial position of the torque shaft 248 and of the source shaft 262. In this specific embodiment, the holding element 292 includes a washer and a snap ring.

Referring generally to the embodiments presented in FIGS. 3 to 6, it will be noted that in each one of the illustrated embodiments, the torque shaft 48, 148, 248 is hollow. Contextually, a source of pressurized oil may be available at the first end 50, 150, 250. Indeed, in one embodiment for instance, a transmission gearbox may be coupled to the output shaft 68, 168. Various accessories may be driven by the transmission gearbox, and such accessories may be circumferentially distributed around the output shaft for instance, to be coupled to different areas thereof. Such accessories may include one or more of a propeller pitch controller, an output drive interface for external accessories, one or more oil pump (e.g. main pump 24, scavenge pump 36), an air conditioning, or environmental control, compressor, an alternator, etc. In one embodiment, the one or more oil pump 24, 36 mechanically coupled to the output shaft 68, 168 may provide a local source of pressurized oil in the vicinity of the first end 50, 150, 250 of the torque shaft 48, 148, 248. One or more oil nozzles may be provided. For instance, an oil nozzle may be provided to provide a jet of oil to the epicyclic gearing. In one embodiment, schematized in FIG. 5, a coaxial oil nozzle 294 may be provided and directed to generate a jet of oil into the oil passage 296 extending along the length of the torque shaft 248, along the rotation axis 246. The jet of oil can be configured to travel along the entire length of the central oil passage 296 and to reach the second end 252 of the torque shaft 248. Oil conduits can be provided across portions of the second end 252 of the torque shaft 248 and/or portions of the source shaft 262. The oil conduits can allow oil received from the jet at the second end 252 of the torque shaft 248 to travel radially outwardly from the central oil passage 296 and reach one or more locations. In one embodiment, the oil conduits can lead to the bearing assembly 274, for instance. A specific configuration of oil conduits is presented in FIG. 6. In this example, oil conduits are provided successively across the torque shaft 248 and across the source shaft 262 and lead both to i) the bearings and ii) the spline engagement. Depending on the embodiment, there may be more than one oil nozzle 294 at the first end, and the one or more oil nozzle 294 may be directed to the epicyclic gearing as well.

Figure 7:
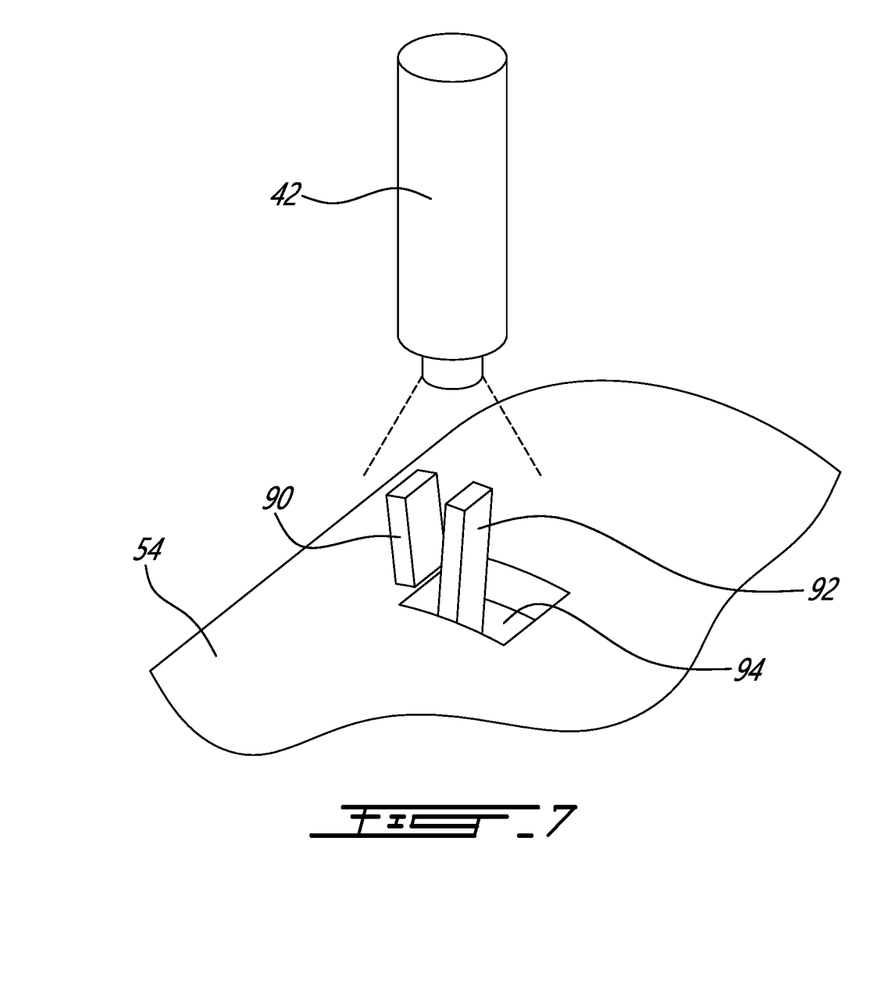
FIG. 7 presents an example of reference features for measuring torque.

As better seen in the schematic illustration of FIG. 7, a first reference feature 90 is provided at the free end of the reference tube 54, 154, 254 and a second reference feature 92 is integrated to the torque shaft 48, 148, 248, at an intermediary location coinciding axially with the location of the first reference feature 90. A torque sensor 42 is fixed relative the rotation axis 46, such as by being secured to a case 76 (e.g. mid-frame case). When the engine 60 operates in a manner to convey power to the output shaft 68, the power is conveyed via the torque shaft 48, 148, 248, which is thus subjected to a torsional force between the first end 50, 150, 250 and second end 52, 152, 252. The torque shaft 48, 148, 248, having a certain degree of elasticity, the torsion can generate a relative circumferential movement between the intermediary location and the location at which the reference tube 54, 154, 254 is fixed. The reference tube 54, 154, 254 having a free end, it does not form part of the power transfer path and is not subjected to torque, nor to torsion. Accordingly, when the engine 60, 160, 260 operates in a manner to convey power to the output shaft 68, 168, the reference feature 92 integrated to the torque shaft 48 can move circumferentially relative the reference feature 90 integrated to the reference tube 54, 154, 254 affecting the circumferential distance between the reference features 90, 92. The amplitude of the change of distance between the reference features 90, 92 can depend on several variables including the elasticity of the material of the torque shaft 48, the radial distance between the reference features 90, 92 and the rotation axis, and the axial length of the reference tube 54, 154, 254. On the one hand, one may wish to increase the radial distance between the reference features 90, 92 and the rotation axis 46, and/or the axial length of the reference tube 54, 154, 254 to lead to a greater amplitude of distance change between the reference features 90, 92 for a given change in torque. However, on the other hand, one may wish to reduce the radial distance between the reference features 92, 90 and the rotation axis 46, and/or the axial length of the reference tube 54, 154, 254 to limit weight, spatial dimensions, or volume of the torque transfer assembly 44. A balance may be achieved by limiting these parameters while ensuring readability of the torque variations.

It will be noted that in the schematic illustration of FIG. 7, while the reference features 92 are provided in the form of teeth of a generally rectangular parallelepiped shape which protrude radially externally from the corresponding component, this is but one potential example of the form reference features can take. Indeed, there are various alternate ways of implementing reference features on the reference shaft and the torque shaft which are known to persons having ordinary skill in the art. These include markings, bumps, etc. Generally, the reference features 90, 92 and the torque sensor 42 will be configured in a way which allows the torque sensor 42 to measure the variation in distance between the reference features 90, 92 when the torque shaft 48 is subjected to variations of torque. The reference tube 54, 154, 254 can have an opening 94 such as a dent or window allowing sensing access to the reference feature of the torque shaft by the torque sensor. If the reference shaft is internal to the torque shaft, the opening may be provided instead in the torque shaft. It may be undesirable for the opening to be in the torque shaft for various reasons, such as difficulty of machining or structural reasons.

Figure 8:
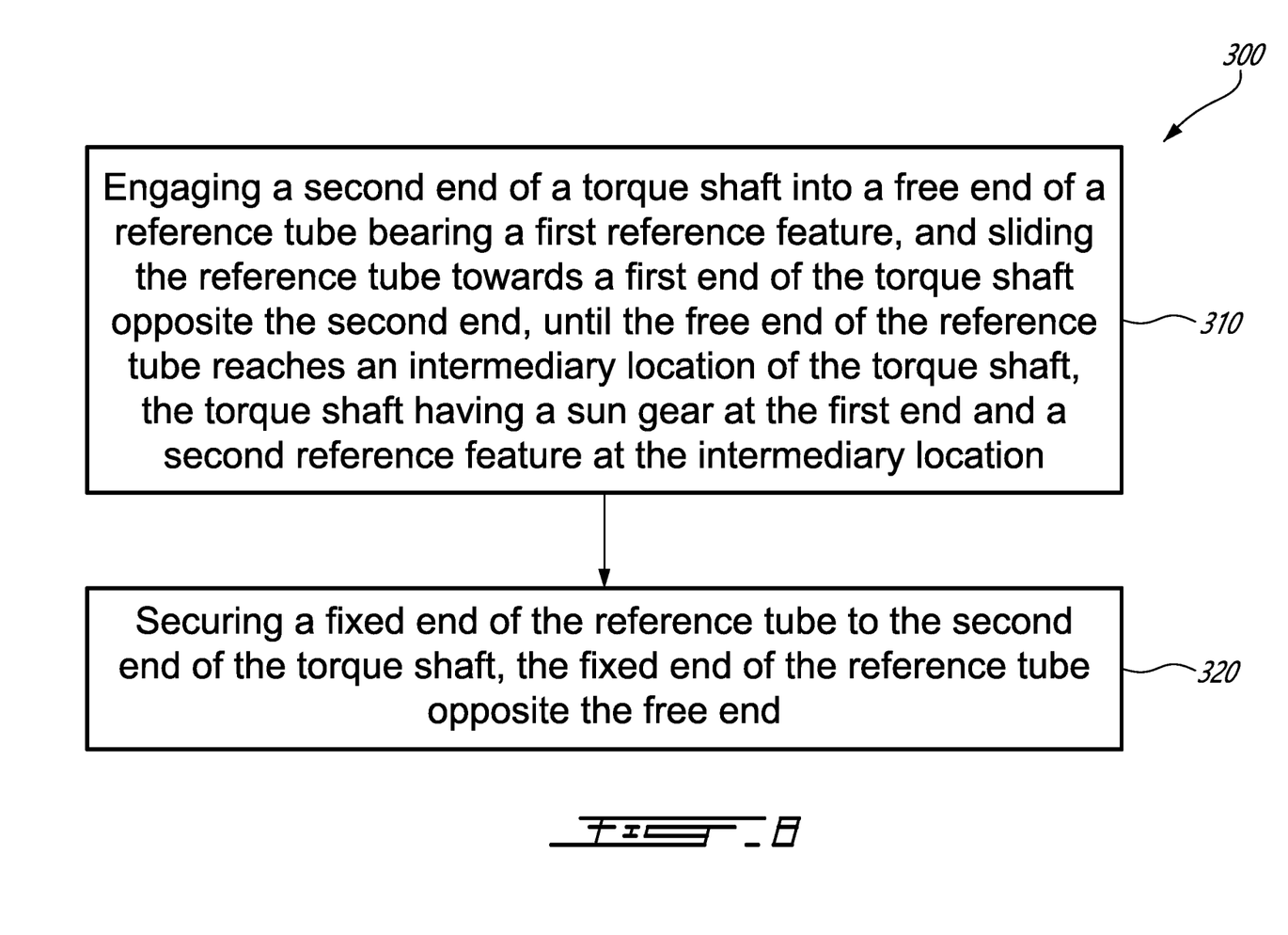
FIG. 8 presents a flow chart of an example method of assembling a torque transfer assembly.

FIG. 8 presents a method 300 of assembling a torque transfer assembly in accordance with one example. In this example, the method includes engaging 310 a second end of a torque shaft into a free end of a reference tube bearing a first reference feature, and sliding the reference tube towards a first end of the torque shaft opposite the second end, until the free end of the reference tube reaches an intermediary location of the torque shaft, the torque shaft having a sun gear at the first end and a second reference feature at the intermediary location; and securing 320 a fixed end of the reference tube to the second end of the torque shaft, the fixed end of the reference tube opposite the free end.

According to one or more embodiments, distance between bearing assembly centerline and the planetary stage may be reduced without impacting minimum distance required on the torque/reference shaft to have sufficient twist to measure torque from the sensor, potentially resulting in a shorter mid frame module and therefore shorter engine.

According to one or more embodiments, the resulting drive assembly may have lower weight and/or cost.

According to one or more embodiments, the resulting drive assembly may have better radial stackup and alignment between sun gear, power shaft and ball bearing.

Still according to one or more of the above described embodiments, the resulting drive assembly may facilitate the integration of an electric engine drive assembly in an existing system or in a new aircraft powerplant for one or more of the reasons presented above, or for other reasons. In particular, incorporation of a torque measurement system within the mid-frame module could be used to provide torque measurement when the e-motor technology and electric/electronic control system does not have sensors to measure the electric power output delivered to the mechanical transmission shaft or when the aircraft application (single, multi-engines) may benefit of redundancy to the powerplant control system in order to meet aviation safety regulations.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A drive assembly comprising:
   a torque shaft rotatable around a rotation axis, the torque shaft having a first end and a second end opposite the first end along the rotation axis, a first reference feature at an intermediary location between the first end and the second end, and a sun gear integrated to the torque shaft, at the first end;

a reference tube having a fixed end secured to the torque shaft adjacent the second end, a free end having a second reference feature adjacent the first reference feature, the reference tube extending around the torque shaft;

a torque sensor fixed relative to the rotation axis, the torque sensor operable to measure a distance between the first reference feature and the second reference feature;

a source shaft rotatable around the rotation axis, the source shaft coupled to the second end;

a ring gear fixed relative the rotation axis and concentric to the rotation axis;

a plurality of planetary gears circumferentially distributed around the rotation axis, the plurality of planetary gears engaged between the sun gear and the ring gear; and an output shaft having a carriage receiving the plurality of planetary gears in an individually rotatable manner, the output shaft rotatable with the carriage and the plurality of planetary gears as a whole around the rotation axis.

2. The drive assembly of claim 1 wherein the reference tube has an internal diameter, the second end has a first external diameter, and the sun gear has a second external diameter, the internal diameter being between the first external diameter and the second external diameter.

3. The drive assembly of claim 2 wherein the fixed end is fixed to the torque shaft via a plurality of circumferentially distributed pins.

4. The drive assembly of claim 1 further comprising a bearing assembly supporting one of the torque shaft and the source shaft adjacent the second end.

5. The drive assembly of claim 4 wherein the torque shaft is hollow and delimits an oil passage between the first end and the second end, the oil passage open at the first end, further comprising one or more oil nozzle operable to direct a jet of oil into the oil passage via the first end, and one or more oil conduits extending between the oil passage and the bearing assembly.

6. The drive assembly of claim 5 wherein the one or more oil nozzle is further operable to direct a jet of oil to the plurality of planetary gears.

7. The drive assembly of claim 1 wherein the torque shaft has a male spline at the second end, the source shaft has a female spline, and the source shaft is coupled to the torque shaft via an engagement of the male spline and the female spline.

8. The drive assembly of claim 1 wherein the torque shaft has a female spline at the second end, the source shaft has a male spline, and the source shaft is coupled to the torque shaft via an engagement of the male spline and the female spline.

9. The drive assembly of claim 8 wherein the female spline is formed in a cavity defined axially into the source shaft, the cavity receiving the male spline, the source shaft having a male member extending into the cavity along the rotation axis, the torque shaft further comprising a radially-inwardly projecting flange leading to a central aperture, the central aperture receiving the male member, the male member secured axially to the torque shaft.

10. The drive assembly of claim 1 further comprising an engine coupled to the source shaft, and a propeller coupled to the output shaft.

11. The drive assembly of claim 10 wherein the engine is an electric engine.

12. A torque transfer assembly comprising:

a torque shaft rotatable around a rotation axis, the torque shaft having a first end and a second end opposite the first end along the rotation axis, a first reference feature at an intermediary location between the first end and the second end, and a sun gear integrated to the first end of the torque shaft, the sun gear and the torque shaft having a unitary body, the second end of the torque shaft has a first external diameter, and the sun gear having a second external diameter greater than the first external diameter; and a reference tube having a fixed end secured to the torque shaft adjacent the second end, a free end having a second reference feature adjacent the first reference feature, the reference tube extending around the torque shaft, the reference tube having an internal diameter, the internal diameter being between the first external diameter and the second external diameter.

13. The torque transfer assembly of claim 12 wherein the fixed end is fixed to the torque shaft via a plurality of circumferentially distributed pins.

14. The torque transfer assembly of claim 12 wherein the torque shaft is hollow and delimits an oil passage between the first end and the second end, the oil passage open at the first end, further comprising one or more oil conduits extending radially outwardly from the oil passage.

15. The torque transfer assembly of claim 12 further comprising a source shaft rotatable around the rotation axis, the source shaft coupled to the second end, wherein the torque shaft has a female spline at the second end, the source shaft has a male spline, and the source shaft is coupled to the torque shaft via an engagement of the male spline and the female spline.

16. The torque transfer assembly of claim 15 wherein the female spline is formed in a cavity defined axially into the source shaft, the cavity receiving the male spline, the source shaft having a male member extending into the cavity along the rotation axis, the torque shaft further comprising a radially-inwardly projecting flange leading to a central aperture, the central aperture receiving the male member, the male member secured axially to the torque shaft.

17. A method of assembling a torque transfer assembly, the method comprising:

engaging a second end of a torque shaft into a free end of a reference tube bearing a first reference feature, and sliding the reference tube towards a first end of the torque shaft opposite the second end, until the free end of the reference tube reaches an intermediary location of the torque shaft, the torque shaft having a sun gear at the first end and a second reference feature at the intermediary location; and securing a fixed end of the reference tube to the second end of the torque shaft, the fixed end of the reference tube opposite the free end.

18. The method of claim 17 further comprising supporting the second end at a bearing assembly.

19. The method of claim 17 further comprising engaging the sun gear with a plurality of planetary gears.

20. The method of claim 17 further comprising positioning a torque sensor at the intermediary location.

* * * * *